(12) United States Patent
Urbanek

(10) Patent No.: US 6,171,097 B1
(45) Date of Patent: Jan. 9, 2001

(54) DEVICE FOR INJECTION MOULDING OF PLASTICS

(75) Inventor: Otto Urbanek, Linz (AT)

(73) Assignee: Engel, Maschinenbau Gesellshaft, Schwertburg (AT)

(*) Notice: Under 35 U.S.C. 154(b), the term of this patent shall be extended for 0 days.

(21) Appl. No.: 09/204,038

(22) Filed: Dec. 1, 1998

(30) Foreign Application Priority Data

Dec. 3, 1997 (AT) .................................................. 2049/97

(51) Int. Cl.[7] .......................... B29C 45/64; B30B 15/06
(52) U.S. Cl. ........................ 425/595; 100/295; 425/451.9
(58) Field of Search ................................ 425/595, 451.9; 100/295

(56) References Cited

U.S. PATENT DOCUMENTS 5,593,711 * 1/1997 Glaesener .......................... 425/595
5,910,328 * 6/1999 Oshiro et al. ..................... 425/595

* cited by examiner

Primary Examiner—James P. Mackey
(74) Attorney, Agent, or Firm—Notaro & Michalos PC

(57) ABSTRACT

Device for injection moulding of plastics has one stationary and one moveable die platen, and a mechanism for producing a closing force between the half moulds carried by the die platens. The closing force is introduced exclusively into selected areas (19) of a supporting frame adjacent longitudinal spars and spaced apart from one another, and the ends of the spars (6) are connected by tension bars (11).

3 Claims, 2 Drawing Sheets

Figure 1:
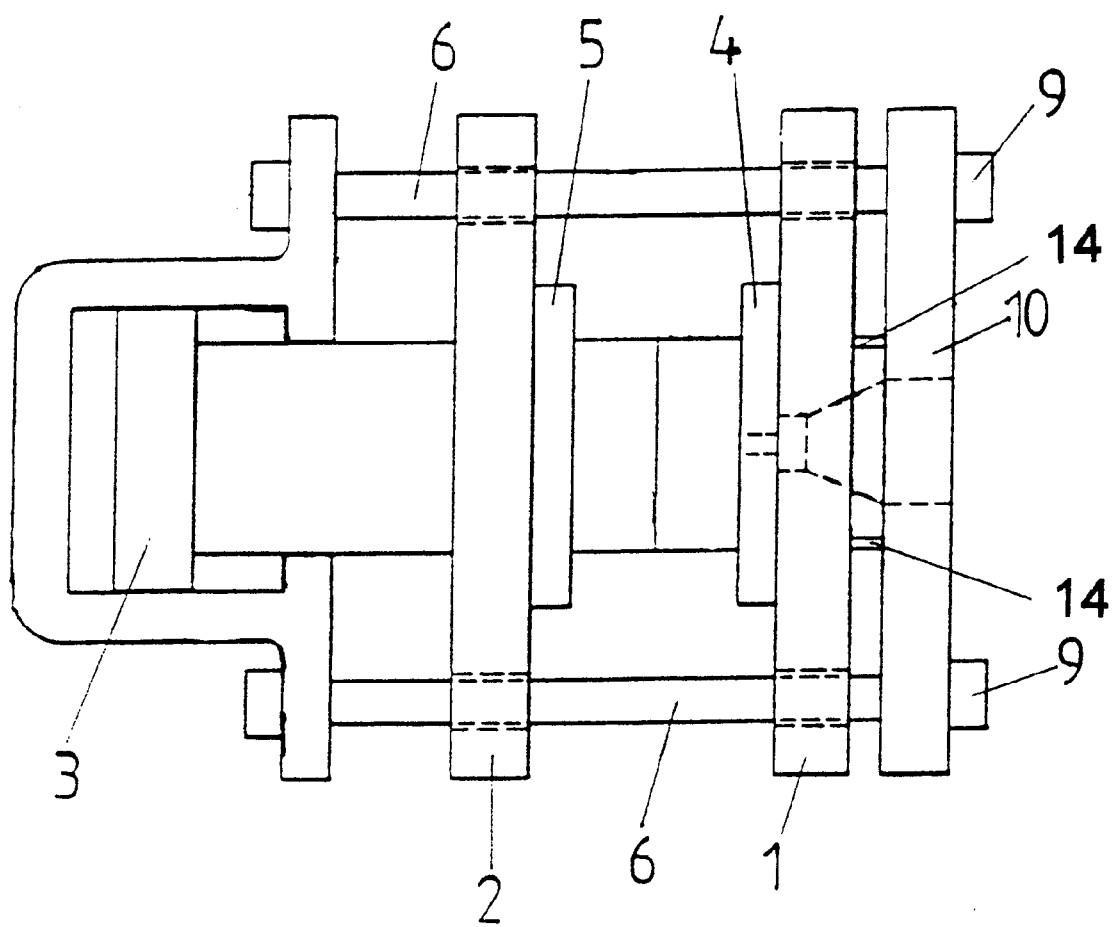

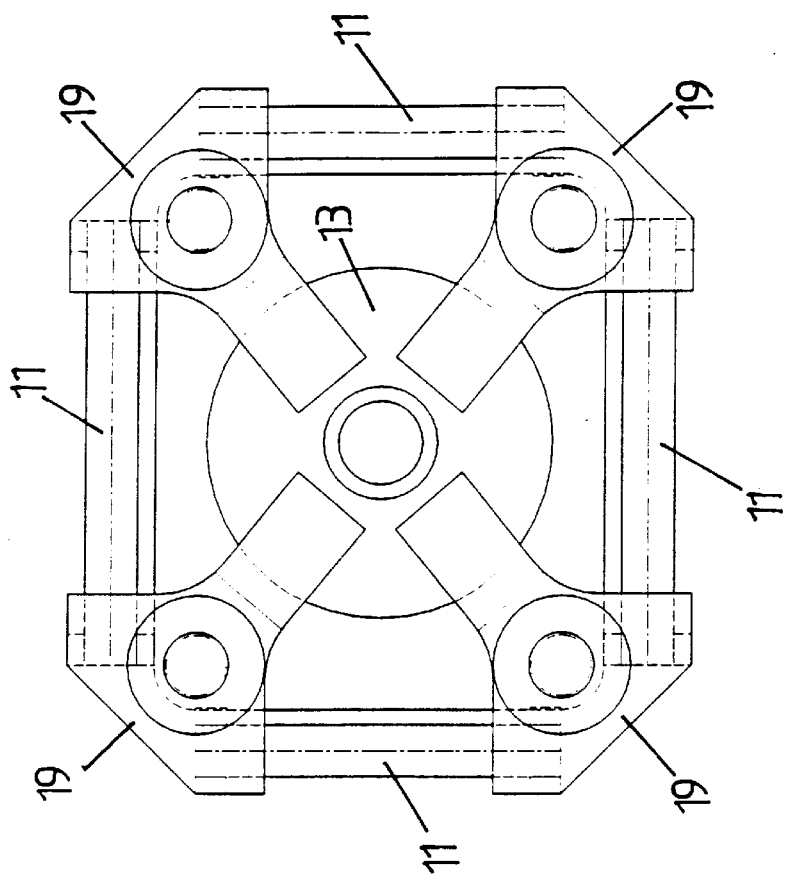
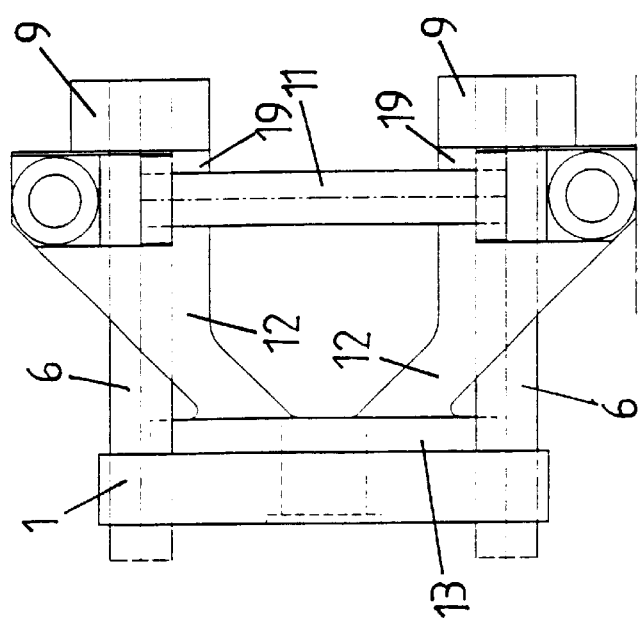

DEVICE FOR INJECTION MOULDING OF PLASTICS

FIELD AND BACKGROUND OF THE INVENTION

The invention relates to a device for injection moulding of plastics, with one stationary and one moveable die platen, and with a means for producing a closing force between the half-moulds carried by the die platens.

With such devices, if the closing force is transferred directly to the stationary die platen, in the case of moulds with small cross-wise dimensions this can result in the die platen bending over the edge of the mould. As will be explained in more detail with reference to FIG. 1, it has already been proposed to arrange a supporting means between the ends of the longitudinal spars and the rear side of the stationary die platen, which ensures that closing force is only introduced to the part of the rear side of the die platen which is opposite to the mould. In known proposals of this type (see DE 40 04 026, DE 25 29 504, EP 0 747 196), the supporting means is always formed by a second plate, parallel to the die platen and serving only for transferring force, which exerts pressure upon a spacer in the form of an optionally conical ring.

SUMMARY OF THE INVENTION

The invention proceeds from the consideration that although bending of the die platen itself is avoided by means of the known solutions, the problem of bending of the plate and spars is only spatially displaced. With respect to this, the invention proposes that the closing force is introduced exclusively to the supporting means, on areas of the supporting means adjacent to the longitudinal spars and spaced apart from one another, and that the ends of the spars are connected by tension bars.

BRIEF DESCRIPTION OF THE INVENTION

Further details of the invention will be explained hereinafter with reference to the drawings. In these is shown, in:

FIG. 1 is a side view of an injection moulding device according to the known prior art, FIG. 2 the side view of the area to the right in FIG. 1, configured according to the invention, and FIG. 3 is a front view A of FIG. 2

DESCRIPTION OF THE PREFERRED EMBODIMENT

The invention proceeds from the prior art as it is shown in FIG. 1. It relates to a device for injection moulding of plastics with one stationary die platen 1 and one moveable die platen 2, and with a hydraulic means 3 for producing a closing pressure between the half moulds 4 and 5, which are carried by the die platens 1, 2. The closing force is applied by the means 3 directly on the rear side of the moveable die platen 2, the closing force reaches the stationary die platen 1 via longitudinal spars 6 which are supported on a pressure plate 10 by means of nuts 9. This pressure plate 10 acts, by means of a hollow cylinder 14, which could also be replaced by a hollow sphere, upon the rear side of the die platen 1. By means of this known measure, distortions of the die platen 1 are avoided. Instead, there are deformations of the spars 6 and of the pressure plate 10, when the latter is drawn over the edge of the hollow cylinder 14.

The object of the invention is to replace the supporting means composed of the plate 10 and hollow cylinder 14 with a device which is suited to the problem of transfer of force from the nuts 9 to the die platen. Such a supporting means is shown hereinafter in FIGS. 2 and 3.

The closing force transferred by tension onto the spars 6 is transferred, in the case of the means according to FIGS. 2 and 3, by means of press rods 12, which each have first ends arranged on an annular carrier 13 connected to the rear of the stationary die platen 1. Preferably, the press rods 12 together with the carrier 13 represent a single casting. In contrast to the state of the art, the introduction of the forces transferred from the longitudinal spars 6 takes place in the press rods 12 exclusively in the end areas 19 of the press rods 12, which surround the longitudinal spars 6 and are pressurized to a great extent directly by the nuts 9.

The tension bars 11 which are anchored into the end areas 19 of the press rods 12, each between a pair of adjacent end areas 19 serve exclusively to receive the force components acting in the plane of FIG. 3, which attempt to press the longitudinal spars 6 outwardly.

As a whole, the supporting means according to the invention for transferring the closing force from the nuts 9 of the longitudinal spars 6 to the stationary die platen is thus composed of the carrier 13, the press rods 12 with the end areas 19 and the tensions bars connecting the end areas 19. The introduction of the forces into the press rods 12 takes place directly via the nuts 9.

As no forces are introduced into the stationary die platen 1 along the sides of the square formed by the longitudinal spars, these sides exclusively have a tensile loading. Instead of the tensions bars 11 shown, a closed band, approximately in the form of a metal cable, enclosing the four longitudinal spars 6 could therefore also be provided.

By means of the solution of the supporting means according to the invention, with components simply under pressure or tension, the unit made up of the die platen 1 and supporting means can be optimally pressurised in a static manner, so that their dimensions can be kept small and there is a substantial saving of materials.

What is claimed is:

1. A device for injection moulding of plastics between two half moulds, comprising:

a stationary die platen for carrying one of the half moulds;

a moveable die platen for carrying the other of the half moulds;

means for producing a closing force between the stationary and moveable die platens;

a plurality of longitudinal spars, each extending through the stationary and the moveable die platens, the longitudinal spars being spaced from each other and each having a spar end spaced from a rear of the stationary die platen which faces away from the moveable die platen, the spar ends of the longitudinal spars being spaced from each other;

a plurality of press rods, each press rod having a first end connected to the rear of the stationary die platen and an opposite end area, the end area of each press rod being connected to the spar end of one of the longitudinal spars for transmitting force from the means for producing a closing force, to the rear of the stationary die platen; and a plurality of tension bars, each connected between adjacent pairs of said end areas of the press rods for mutually supporting the spar ends.

2. A device according to claim 1, including an annular carrier connected to the rear of the stationary die platen, the first ends of each of the press rods being connected to the annular carrier.

3. A device according to claim 2 wherein each of the longitudinal spars extends through a corner of the stationary die platen, each press rod extending from the spar end of one of the longitudinal spars, inwardly toward the annular carrier in a direction from the spar end toward the rear of the stationary die platen.

* * * * *